United States Patent [19]
Kokkinen

[11] Patent Number: 6,091,440
[45] Date of Patent: Jul. 18, 2000

[54] IMPLEMENTATION OF DELAY-CRITICAL SERVICES IN A CABLE TELEVISION SYSTEM

[75] Inventor: Heikki Kokkinen, Helsinki, Finland

[73] Assignee: Nokia Technology GmbH, Pforzheim, Germany

[21] Appl. No.: 08/979,489

[22] Filed: Nov. 28, 1997

[30] Foreign Application Priority Data

Nov. 29, 1996 [FI] Finland ................................ 964795

[51] Int. Cl.⁷ ........................................ H04N 7/10
[52] U.S. Cl. .......................... 348/6; 370/458; 370/912
[58] Field of Search .................... 348/10, 12, 13, 348/1, 2, 6, 7; 455/2, 3.1, 4.2, 5.1; 370/458, 912

[56] References Cited

U.S. PATENT DOCUMENTS 5,546,119  8/1996  Bestler et al. ........................... 348/10

FOREIGN PATENT DOCUMENTS

| 0523648 | 1/1993 | European Pat. Off. . |
| 0691759 | 1/1996 | European Pat. Off. . |
| 0730382 | 9/1996 | European Pat. Off. . |
| 0750424 | 12/1996 | European Pat. Off. . |
| 96/15599 | 5/1996 | WIPO ............... H04J 3/16 |
| 9615599 | 5/1996 | WIPO . |
| 9633590 | 10/1996 | WIPO . |
| 9706622 | 2/1997 | WIPO . |

OTHER PUBLICATIONS

DAVIC 1.0 Specification Part 08, "Lower Layer Protocols And Physical Interfaces", Revision 4.1.
DAVIC 1.0 Specification Part 08 "Lower Layer Protocols And Physical Interfaces" Dec. 1995.
DAVIC 1.0 Corrigenda Part 08 "Lower Layer Protocols And Physical Interfaces" Revision 2.0, Jun. 1996.
DAVIC 1.1 Specification Part 8 "Lower Layer Protocols And Physical Interfaces" (Technical Specification) Revision 3.3.
ETSI draft specification pr ETS 300 800 "Digital Video Broadcasting (DVB); DVB interaction channel for Cable TV distribution system (CATV)" TM 1640 Rev. 5, Jul. 19, 1996.
DAVIC 1.1 Specification Part 08, Wireless Working Group Taipei Meeting Sep. 15–19, 1997 (Corrigenda) Rev. 3.0.
DAVIC 1.3 Specification Part 8, Corrigenda for Baseband PHY Systems, Revision 6.0.

*Primary Examiner*—Andrew I. Faile
*Assistant Examiner*—Sam Huang
*Attorney, Agent, or Firm*—Ware, Fressola, Van Der Sluys & Adolphson LLP

[57] ABSTRACT

For transmitting delay-critical data in a digital, time division form in an additional channel of a cable television system, the slots of the channel are further divided into smaller mini slots, for the indication of which the same cyclic indication is used as with which the superframes controlling the use of the channel indicate the original slots. A method based on mini slots is compatible with DAVIC 1.0 and 1.1 specifications.

13 Claims, 7 Drawing Sheets

IMPLEMENTATION OF DELAY-CRITICAL SERVICES IN A CABLE TELEVISION SYSTEM

BACKGROUND OF THE INVENTION

1. Technical Field

The present invention relates to an arrangement of data connections associated with communication services such as telephone, meeting and game services which require as short a data transmission delay as possible.

2. Discussion of Related Art

A cable television system is most conventionally a distribution network resembling a tree, at the root of which lies the main amplifier of the operator controlling the network, i.e. the so-called head-end. The main amplifier may more generally be called a central configuration. The distribution lines branch from it in a tree-like fashion towards the data terminal equipment of the subscribers, of which there may be hundreds of thousands under one central configuration. In order to compensate the weakening of the signal and to reduce interferences, the distribution lines comprise distributing amplifiers, repeaters and other devices known per se.

Lately, plans have been proposed to change the cable television systems from one-way distribution networks to two-way data transmission networks. In this case, the direction of data transmission from the central configuration to the data terminal equipment is generally called downstream (DS), and the reverse direction upstream (US). In addition to a high-capacity downstream main channel, the system includes additional channels; these include at least an upstream channel, through which the data terminal equipment may transfer data to the direction of the central configuration, and a relatively low-capacity downstream control channel, though which the central configuration controls the use of upstream connections. The control channel may consist of cyclically recurrent fields which the central configuration multiplexes with the digital video picture or another signal transmitted in the main channel by utilizing its frame structure. Such a control channel is a so-called in-band control channel. In another embodiment, the control channel is situated on an own frequency band, thus being a so-called out-of-band control channel.

The present invention may be applied to digital video systems known in themselves, i.e. DAVIC (Digital Audio Visual Council) and DVB (Digital Video Broadcasting). The system specifications significant for the invention are found in the publications "DAVIC 1.0 specification part 08; Lower layer protocols and physical interfaces, December 1995", "DAVIC 1.0 corrigenda part 0.8; Lower layer protocols and physical interfaces, Edited version after New York meeting, Rev. 2.1, June 1996", "DAVIC 1.1 specification part 08; Lower layer protocols and physical interfaces Rev. 3.3", and "ETSI draft specification prETS 300 800; Digital Video Broadcasting (DVB); DVB interaction channel for cable TV distribution system (CATV), TM 1640 Rev. 4, June 1996". The cable TV system disclosed in the publications may be based on coaxial cables, or at least partly on optical fibres; in the latter case, it is also called a HFC (Hybrid Fibre Coax) network.

FIG. 1 illustrates a proposition included in the publication prETS 300 800 for allocating frequencies in a DVB system. The dimensions on the horizontal frequency axis are indicative, and the vertical axis only shows which signals are directed towards the data terminal equipment from the central configuration (DS, upwards in the figure), and which extend to the reverse direction (US, downwards in the figure). The frequency range 100 extends from about 50 MHz to almost 900 MHZ, and it is typically divided into channels 102 of 6–8 MHz, of which only three are shown for clarity. Each channel contains one QAM (Quadrature Amplitude Modulation) modulated signal which may include, for example, one or more digital video signals in a MPEG-TS format (Motion Picture Experts Group—Transport Stream) or other data requiring a high transfer capacity. The frequency range 103 extends from 70 MHz to 130 MHz, and it contains channels 104, which are 1 or 2 MHz wide, each transferring a QPSK (Quadrature Phase Shift Keying) modulated control channel. For clarity, of these only three are shown in the figure. The frequency range 105 extends from 300 MHz to 862 MHz, and its contents correspond to the frequency range 103. The frequency range 106 of the figure, extending from 5 MHz to 65 MHz, is reserved for upstream connections, and it contains channels 107, of which only three are shown in the figure, and which are 200 KHz, 1 MHz or 2 MHz wide. The QPSK modulation is also intended to be used in upstream connections. The new specifications of the DAVIC system are, however, also prepared to use the QAM modulation in channels of low capacity.

A transmission especially in a channel of the DAVIC system containing data about the use of one or more upstream channels, consists in accordance with FIG. 2 of SL-ESF frames 108 (Signalling Link Extended Superframe). The length of one SL-ESF is 4632 bits, and it is divided into 24 frames of 193 bits. In FIG. 2, the frames are numbered from 1 to 24, and additionally, an enlarged frame is described with the reference number 109. Each frame starts with a so-called overhead bit 110, which is followed by a payload 111 of 192 bits. The significance of the overload bit depends on which frame of the SL-ESF is observed. In flames 4, 8, 12, 16, 20 and 24 included in the SL-ESF, the value of the overhead bit is a fixed framing bit, i.e. a so-called F bit. Correspondingly, the overhead bits of the frames 2, 6, 10, 14, 18 and 22 are so-called C bits, which, when placed successively, form a CRC checksum describing the bit contents of the previous SL-ESF. In every other frame, beginning from frame 1, the overhead bit is an M bit, i.e. part of a so-called M counter indicating the numbering and timing of the slots of an upstream channel controlled in this control channel.

Communications in each upstream channel is divided into slots 112, as described in FIG. 3. The central configuration determines the use of the slots so that part of the slots may be used for ranging aiming at the measurement and compensation of transfer delays, part are conventionally freely available for data terminal equipment (so-called contention-based slots), part has been determined for the use of data terminal equipment having made a reservation in accordance with a specific reserve inventory (so-called reservation slots), and part has an operation time schedule distributing a certain regular data transmission capacity for the use of one connection (so-called contentionless-based slots). In the DAVIC system, the central configuration transmits data concerning the use of eight upstream channels in one downstream channel.

The communication of downstream and upstream channels is synchronized so that each downstream SL-ESF, the M bits M1, M5 and M9 (in SL-ESF, the sequence numbers of these bits from the beginning of SL-ESF are 0, 1544 and 3088) correspond to the so-called slot position references. If the bit rate of a downstream channel is 1,544 Mbit/s, the period of two successive slot position references accommodate three upstream slots, i.e. the temporal length of one downstream SL-ESF is the same as the added temporal length of nine upstream slots. If the bit rate of an upstream channel is 256 kbit/s, one upstream slot is temporally as long as the time from one slot position reference over the next to the next one so that the temporal length of one downstream SL-ESF is the same as the added temporal length of one and a half upstream slots. If the bit rate of an upstream channel is 3,088 Mbit/s, the period between two slot position references accommodates six upstream slots, i.e. the temporal length of one downstream SL-ESF is the same as the added temporal length of 18 upstream slots.

For the identification of downstream SF-ESFs and upstream slots, they are numbered cyclically. The numbering of SL-ESFs runs from 9 to N, where N is the size of the cycle, i.e. the largest sequence number used for SL-ESF. The cycles mean that the SL-ESF number 0 is followed by SL-ESF number 1, which is followed by SL-ESF number 2, and so on, until SL-ESF number N is again followed by SL-ESF number 0, and the numbering starts all over. If the bit rate of a downstream channel is 3,088 Mbps, two sequential SL-ESFs are always given the same sequence number, i.e. the sequence number changes only at the place of every other SL-ESF. The M bits M10–M1 of each SL-ESF form a 10-bit register where M10 is the most significant bit and M1 the least significant, and the value of which indicates the sequence number of the SL-ESF. As the register includes 10 bits, the largest possible value for the number N is $2^{10}$. The data terminal equipment maintain the numbering of upstream slots, which is synchronized with the numbering of SL-ESFs. If, for example, the bit rate of 1,544 Mbps is used both in downstream and upstream, the slots from 0 to 8 correspond to the SL-ESF number 0 and the slots from 9 to 17 correspond to the SL-ESF number 1, and so forth.

A data terminal equipment, to which a certain slot of an upstream channel has been assigned, transmits a burst of 64 bytes during the slot in question. A burst 113 is shown in more detail in FIG. 3. At the beginning of the burst there is a synchronization period 114 of four bytes, which is called Unique Word and which corresponds to the hexa number sequence CC CC CC 0D. It is followed by a payload 115 of 53 bytes, which most commonly is an ATM cell, and a six-byte Reed-Solomon code 116 is calculated from its contents. At the end of the burst there is a guard period 117 of one byte.

The upstream slots are grouped as shown in FIG. 3, the groups including 3, 9 or 18 slots depending on the bit rate (256 kbps, 1,544 Mbps or 3,088 Mbps). In the case of FIG. 3, each group contains 9 slots, i.e. it is an upstream channel of 1,544 Mbps. The data terminal equipment for which a certain regular data transmission capacity is assigned in accordance with the contentionless principle, may, for example, receive one slot from each group. In the case of FIG. 3, a certain data terminal equipment, which is denoted with A, has received the fourth slot in every group. The data terminal equipment B makes it with half a smaller data transmission capacity so that it receives one slot (in the Fig. the sixth slot) from every other group. The data transmission need of the data equipment terminal C is further half of the data transmission need of B so that it receives one slot from every fourth group.

If the data terminal equipment requires more data transmission capacity than the data terminal equipment A, it is assigned several slots from each group. In accordance with the cyclical indication of slots defined in the DAVIC system, the slots received by a certain data terminal equipment are defined so that they are situated equidistantly in a string of upstream slots. In order for this precondition to be in harmony with the fact that, for facilitating the indication arrangements, the slots assigned for a certain data terminal equipment have to be situated in successive slot groups at same places in relation to the group's start and end, only certain multifolds of slots are possible for achieving a larger data transmission capacity. Depending on the bit rate of the upstream channel, the permitted multifolds are 1 and 3 (with bit rate of 256 kbps); 1, 3 and 9 (with the rate of 1,544 Mbps), or 1, 3, 9 and 18 (with the rate of 3,088 Mbps). The assignment of contentionless-based slots is realized so that the Connect-message transmitted to the data terminal equipment by the central configuration includes a so-called Cyclic_Assignment record of six bytes in length, which contains three fields of two bytes long, i.e. a start field, a distance field, and an end field. The central configuration uses these fields to inform in which slot the data terminal equipment may start its transmission, what is the mutual distance between the slots assigned to it, and in which slot the data terminal equipment has to end the transmission.

The data transmission rate equalled by one slot in each slot group may be called the root bit rate (RBR). When the bit rate of the upstream channel is 256 kbps, the root bit rate is 64 kbps. If the bit rate of the upstream channel is 1,544 Mbps or 3,088 Mbps, the root bit rate is 128 kbps. The possible data transmission rates corresponding to different slot arrangements permitted for one data terminal equipment are, for example, 1,152 Mbps, 384 kbps and 128 kbps in an upstream channel of 1,544 Mbps, and bit rates smaller than those above so that the next bit rate is always half the former.

When trying to apply the said state-of-the-art arrangement for arranging a two-way data transmission in a cable television system to carry out delay-critical services, one is confronted with certain problems. Here, the delay-critical services refer to so-called communicative services in which messages in the nature of questions and answers are exchanged between the sender and the receiver, the questioner wishing to receive the answer as soon as possible. The most common delay-critical services are telephone connections and various teleconference services, but also some multi-player games set similar demands for the shortness of delays. While the tele services are diversifying, new services are generated all the time, part of which will always be delay-critical. The delay causes both the slowing down of the communication and the disturbing echoing of the sent data from the receiver back to the sender.

A digital telephone connection in accordance with the publication ITU-T Recommendation G.711 is viewed as an example; this connection conveys digital speech signals generated on a sampling frequency of 8 kHz and with an 8-bit A/D conversion so that the bit rate required for data transmission is 64 kbps. It has to be noted that data to be transferred is also generated with the same bit rate; if ATM cells with a payload of 48 bytes (384 bits) are used for data transmission, filling an ATM cell with the rate of 64 kbps takes 6 milliseconds. In order to optimally use the capacity of the channel, the equipment does not transmit the ATM cell forward before it is full, so that merely filling the ATM cell causes a delay of 6 ms to the signal. In the publication "Lee, Kyoo J.: Signal Delay Requirement for IEEE 802.14 protocol to support voice application, IEEE 802.14, Jan. 10, 1996, IEEE 802.14–96/011" it is proposed that the reciprocating delay for the telephone service should be less than 3,4 ms so it is obvious that the data transmission system based on ATM cells described above is not able to provide delay-critical services in a desired way.

SUMMARY OF INVENTION

The object of the present invention is to provide a data transmission system and equipment for the production of delay-critical services in a cable television system, especially in a DAVIC system.

The objects of the invention are achieved by dividing the slots of the DAVIC system into shorter mini slots for the delay-critical service, and to arrange their assignment in a way compatible with the present DAVIC system.

It is characteristic of a method of the present invention for transmitting data in an additional channel of a cable television network applying a time division multiple access operation, in which time slots are assigned for different equipment for the distribution of data transmission capacity, and in which the operation of the slots in a cable television network is controlled by operating assignments transmitted downstream, that the slots are further divided into mini slots, the use of which is controlled by operating assignments transmitted downstream.

The present invention further relates to a cable television system, which is characterized in that the central configuration comprises means for regrouping the control commands so that they assign mini slots for the single data terminal equipment, which are temporally shorter than the state-of-the-art slots, and that at least one data terminal equipment comprises means for transmitting data as mini bursts the size of a mini slot so that the data terminal equipment is provided to transmit data as bursts or mini bursts in accordance with the control commands it receives from the central configuration.

In the arrangement of the invention, the smallest separate unit of the data transmission capacity given to the use of one data terminal equipment is a mini slot, the size of which is selected most advantageously so that the added temporal length of three successive mini slots is substantially the same as the length of one state-of-the-art slot. It is also possible to determine a mini slot of another size. For the numbering of mini slots, an expansion of cyclical numbering of the state of the art is used, and their operation is controlled by control messages included in the downstream control channel SL-ESF. The mini slot arrangement of the present invention is compatible with the DAVIC 1.0 and 1.1 specifications, but it provides two-way cable television communications with a new data transmission mode of the STM type (Synchronous Transfer Mode) applicable especially to the realization of delay-critical services. As the payload part of a burst transmitted within a mini slot has considerably fewer bits than the payload of an ATM cell, a device transmitting in accordance with the invention does not cause a relatively long delay of the state of the art, which is described above.

BRIEF DESCRIPTION OF THE DRAWINGS

The present invention is next described in more detail referring to an exemplary advantageous embodiment and to the enclosed drawings, in which.

DETAILED DESCRIPTION OF PREFERRED EMBODIMENTS

Figure 1:
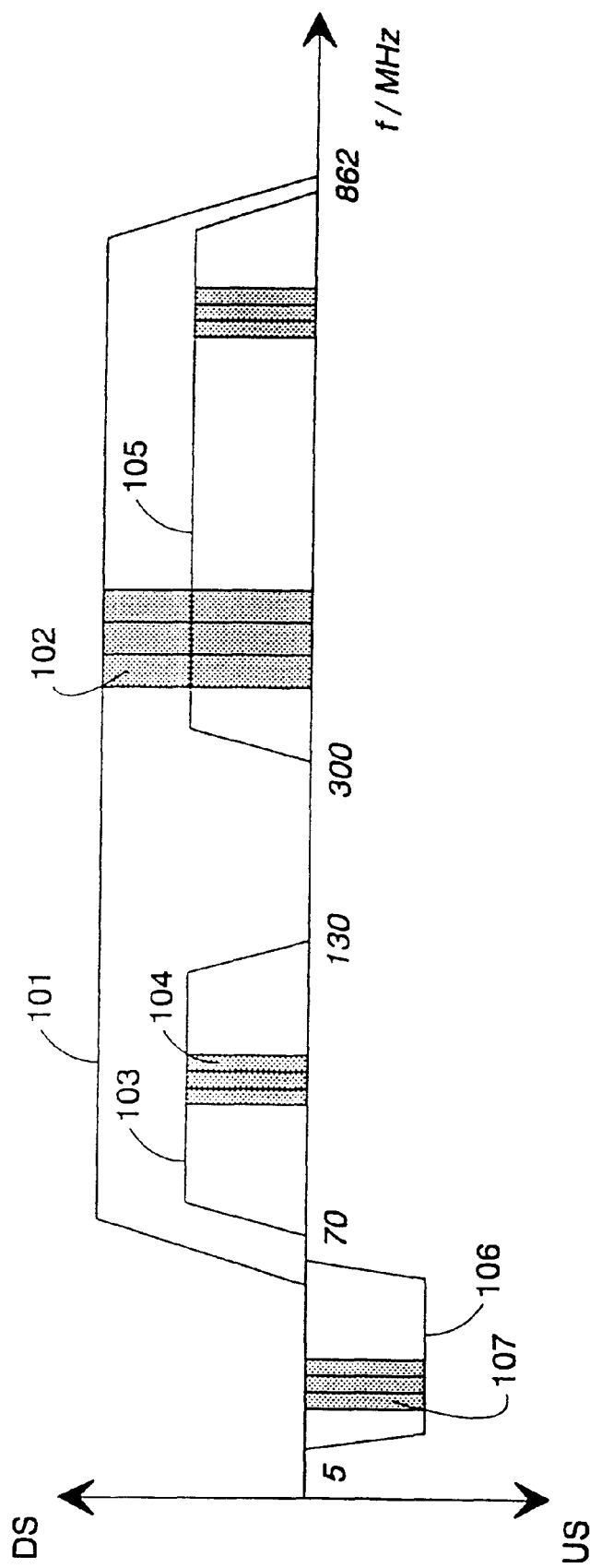
FIG. 1 illustrates a known proposition for the distribution of frequencies in a DVB system.
Figure 2:
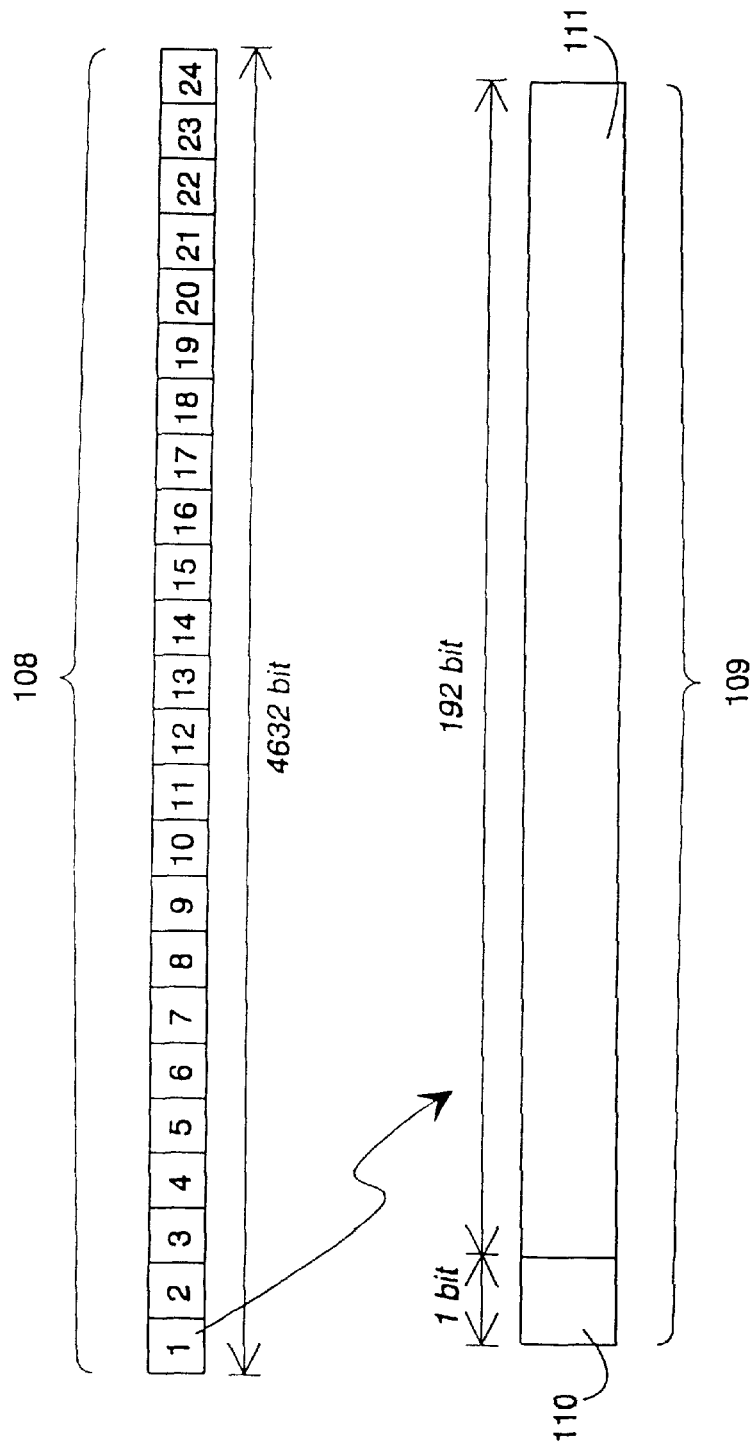
FIG. 2 illustrates the distribution of transmission in a known control channel.
Figure 3:
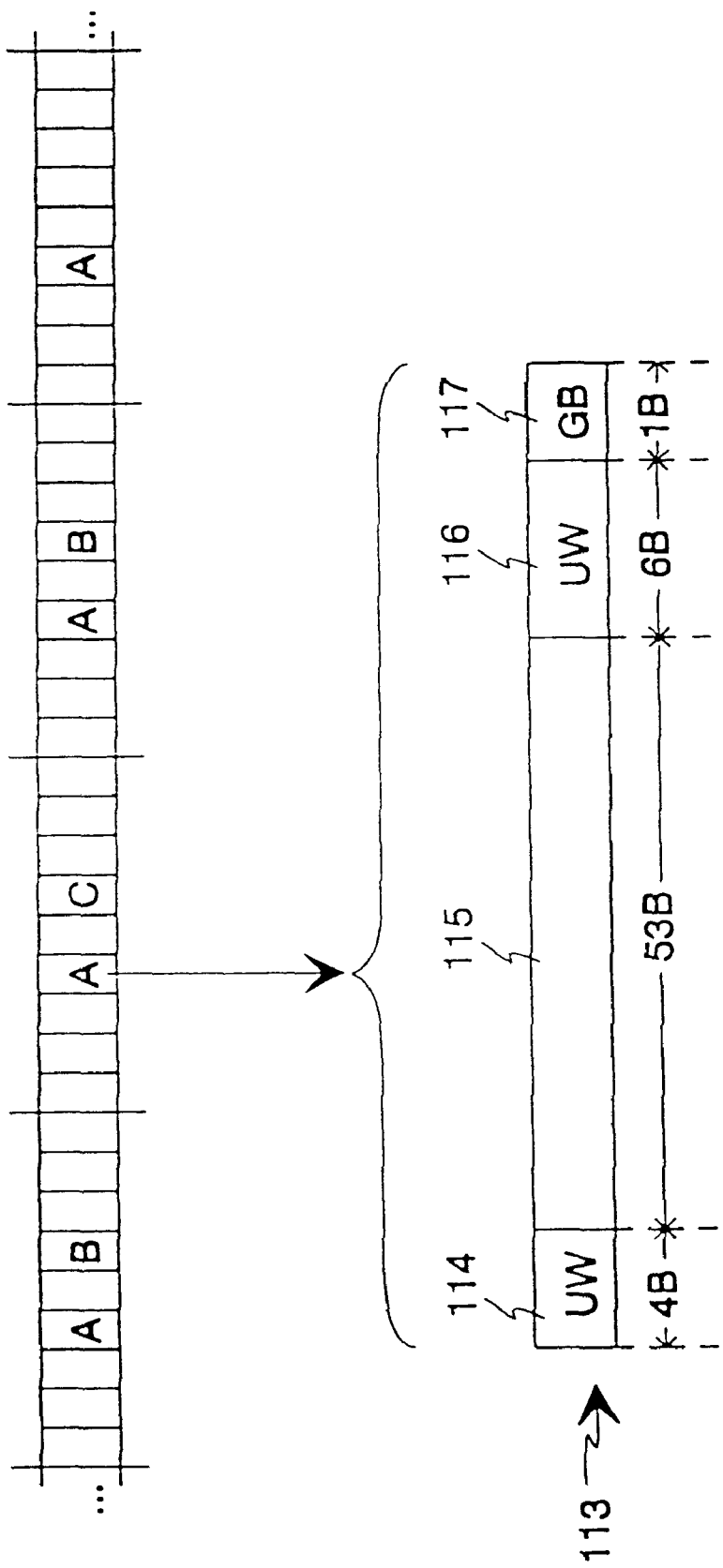
FIG. 3 illustrates the distribution of transmission in a known upstream channel.
Figure 4:
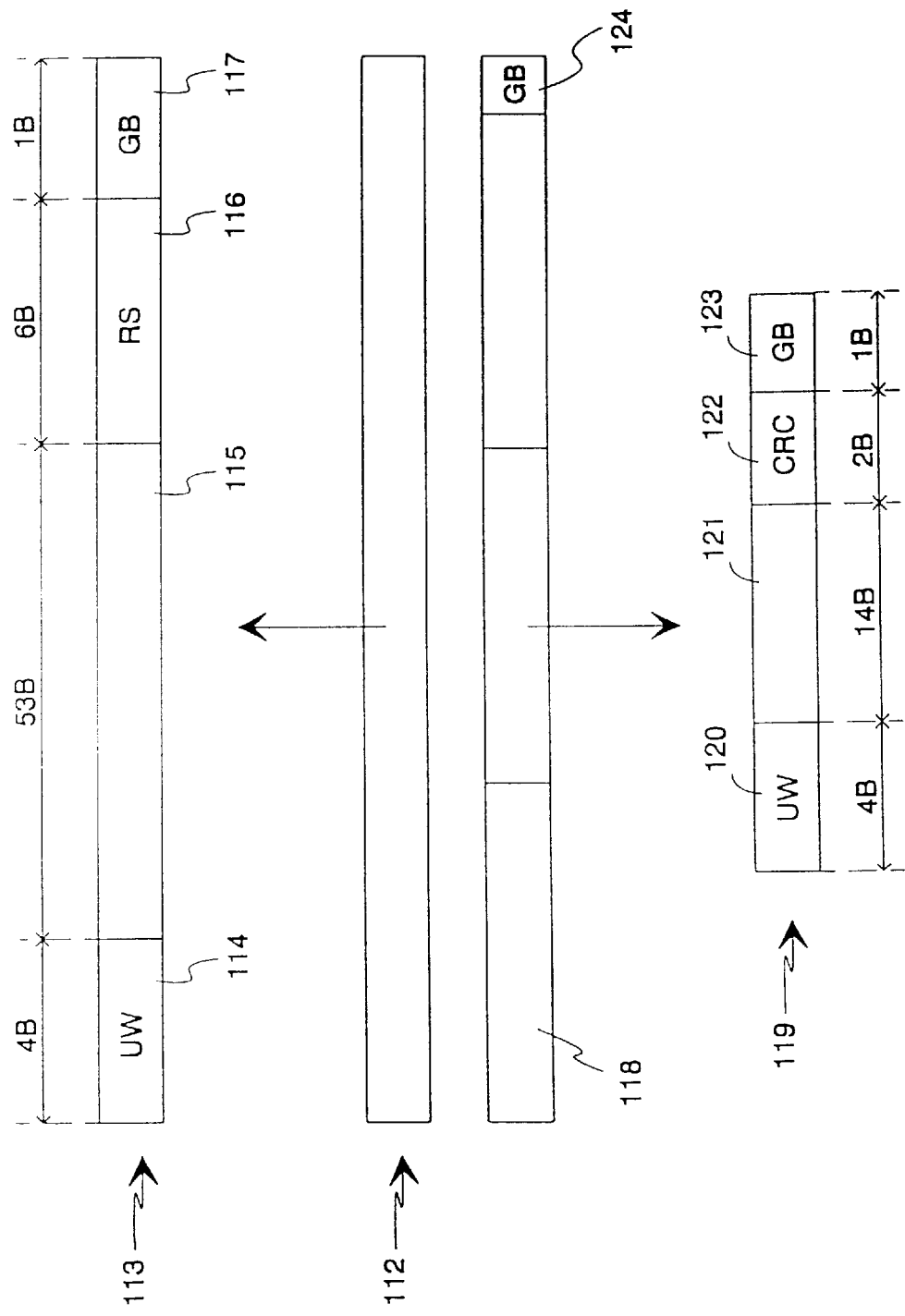
FIG. 4 illustrates a slot structure of the invention.
Figure 5:
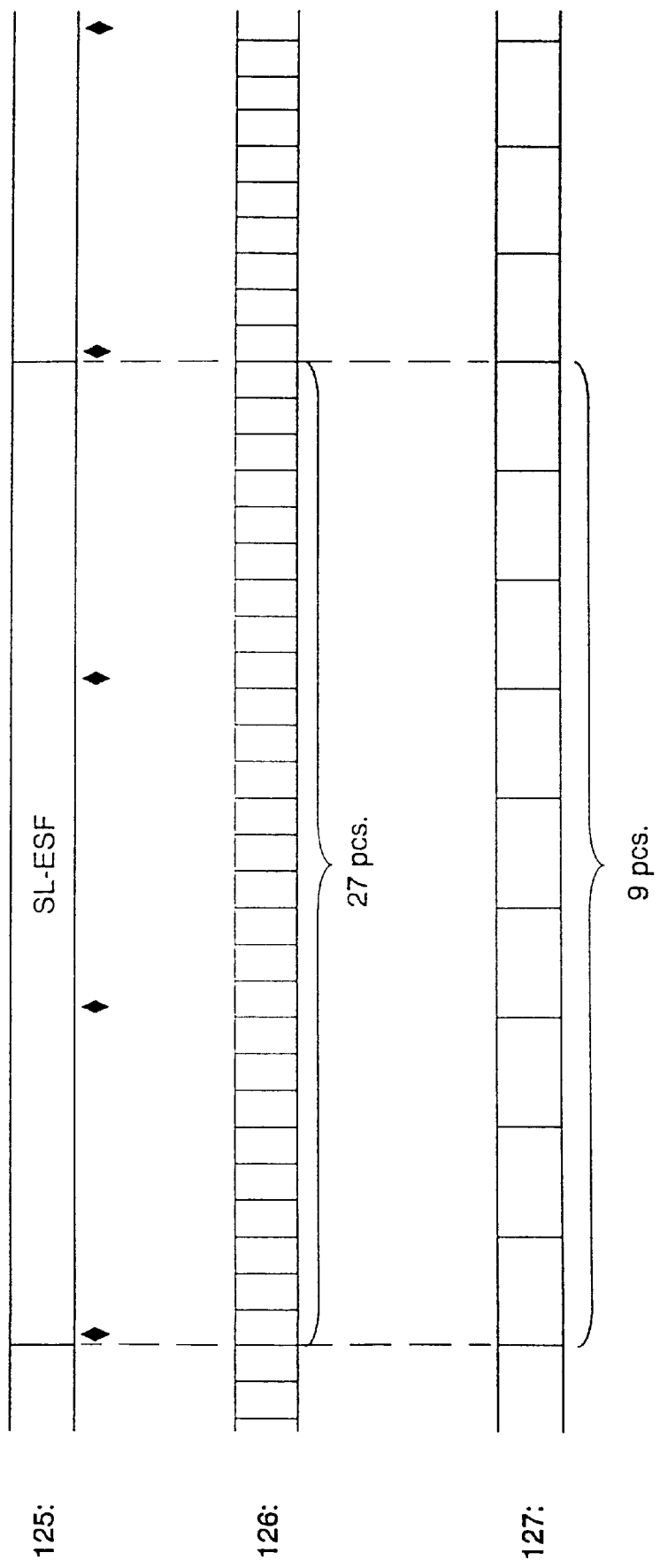
FIG. 5 illustrates the synchronization arrangement of slots of the invention.
Figure 6:
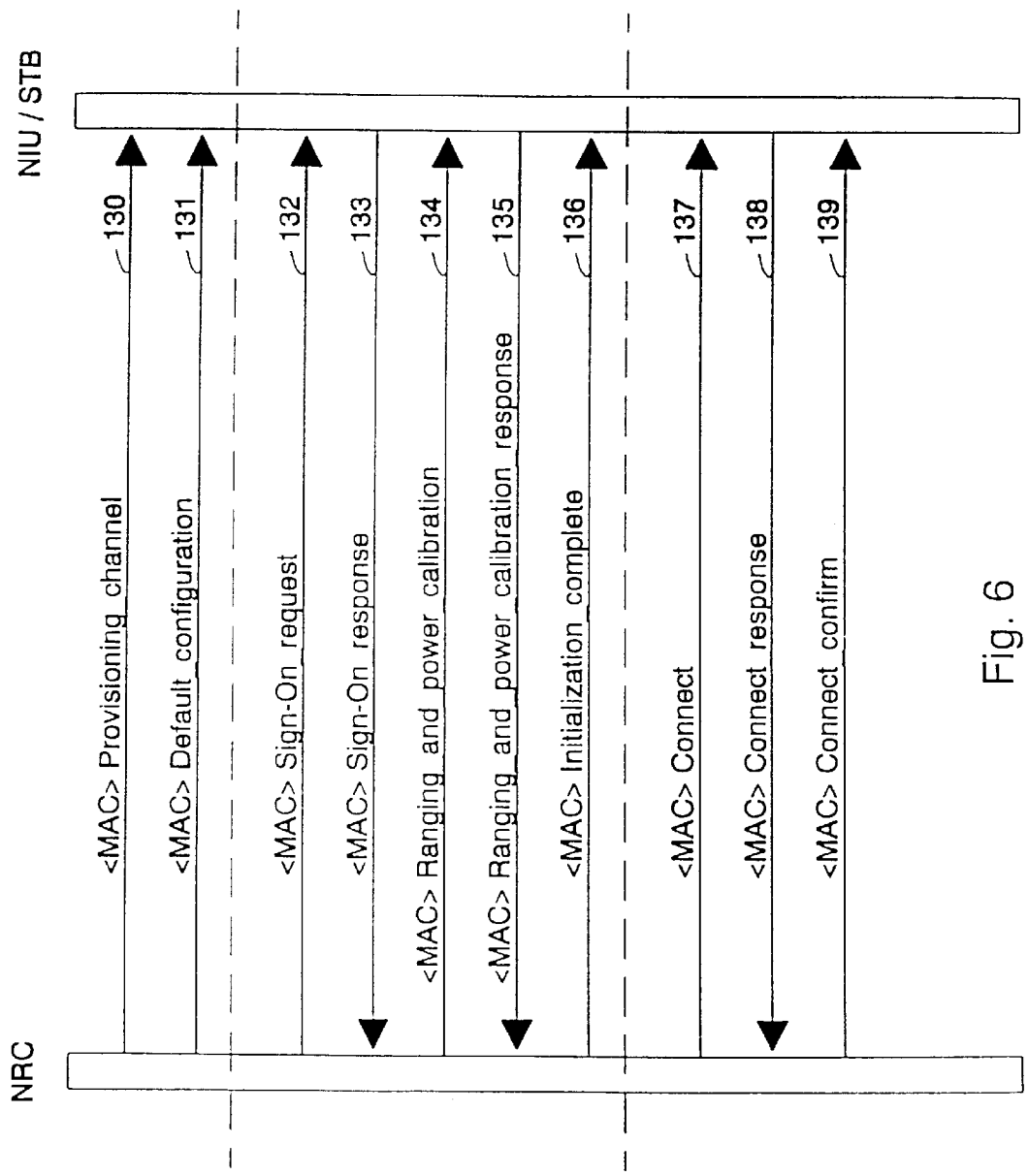
FIG. 6 illustrates the exchange of messages between the central configuration and the data terminal equipment.

In connection with the description relating to the state of the art, reference is made to FIGS. 1–3 so that the description of the present invention and its advantageous embodiments refers mainly to FIGS. 4–6. In the figures, the same reference numbers are used of corresponding parts.

Figure 7:
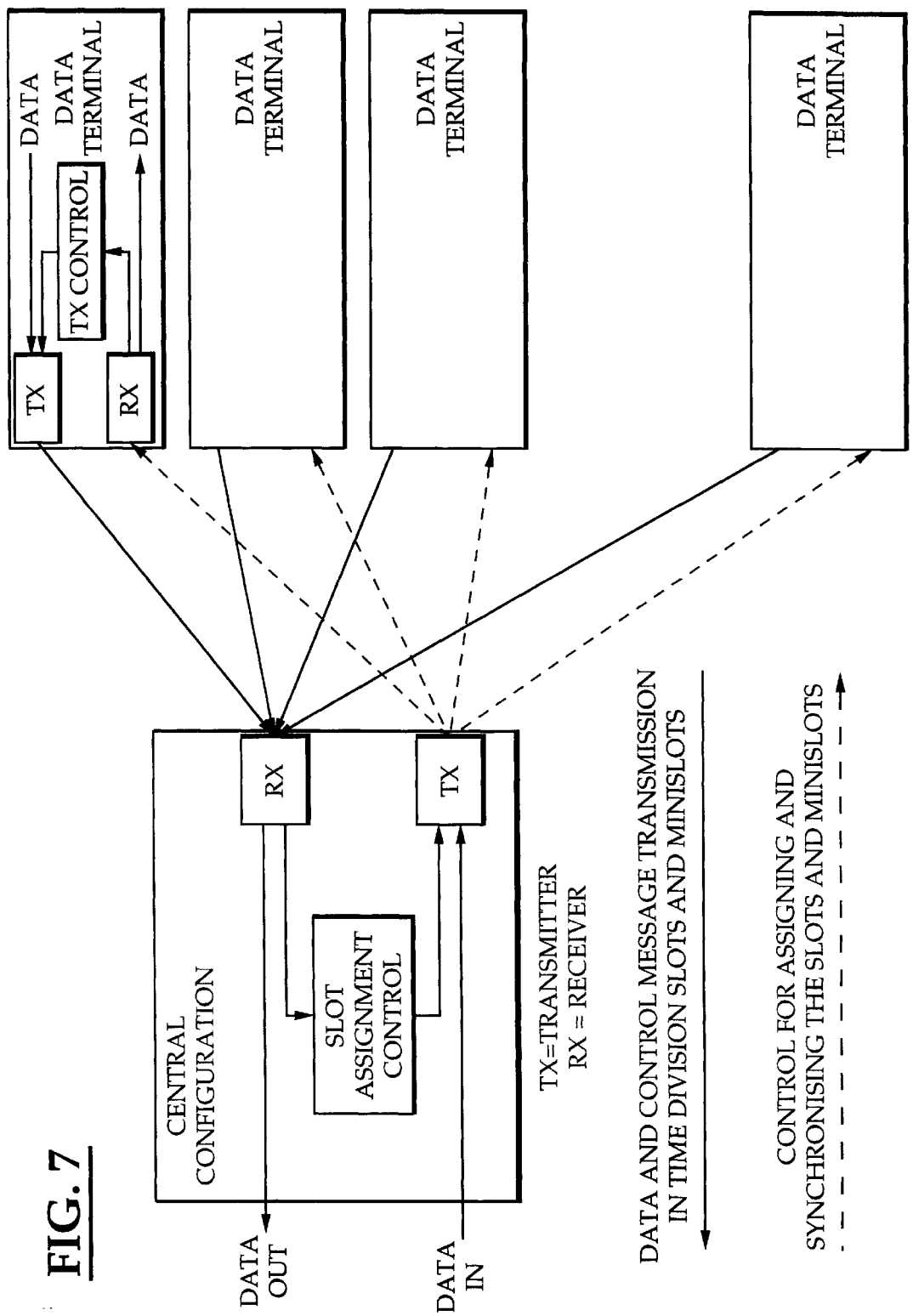
FIG. 7 illustrates a cable television system comprising a central configuration and data terminal equipment where data is transmitted therebetween over cables for implementation, according to the present invention, of delay-critical services.

In the description of FIGS. 4–6, which follows, reference may be had to the cable television system illustrated in FIG. 7, which comprises a central configuration and several data terminal equipment in a data transmission connection, where data is transmitted by cables. The central configuration comprises means for receiving data from data terminal equipment in accordance with a time-division principle in slots and includes means for establishing control commands to assign the slots for the use of separate data terminal equipment. In such a cable television system, at least one data terminal equipment includes means for receiving control commands from the central configuration and further includes means for transmitting digital data to the central configuration in burst form in a slot defined by the control commands. According to the present invention, the central configuration further comprises means for resynchronizing the control commands so that they assign mini-slots for the use of separate data terminal equipment, which are temporally shorter than the slots. Moreover, the data terminal equipment further comprises means for transmitting data as mini-bursts the size of a mini-slot so that the data terminal equipment is provided to transmit data as bursts or mini-bursts according to what kind of control commands it receives from the central configuration.

FIG. 4 illustrates a mini slot structure which is considered to be the most advantageous embodiment of the invention. Here, the added temporal length of three successive slots is substantially the same as the length of one upstream slot according to the state of the art. For comparison, FIG. 4 also illustrates a known slot 112 and a known burst 113. A transmitting equipment according to the state of the art transmits a burst 113 in a slot 112, the burst consisting of a synchronization block 114 of four bytes, a payload part 115 of 53 bytes, and a six-byte Reed-Solomon code 116 calculated from its contents. At the end of the burst there is a guard period 117 of one byte. The device transmitting in a mini slot 118 of the invention transmits a burst 119, which may be called a mini burst and at the beginning of which there is a similar synchronization block 120 as at the beginning of a state-of-the-art burst. The payload part 121 of the mini burst is only 14 bytes (112 bits) long. For error correction, the mini burst includes a two-byte (16-bit) CRC code 122, and the end of the mini slot includes a guard period 123 of one byte. The length of the mini burst in bytes, the guard period included, is 21 bytes so that the length of three successive mini bursts is 63 bytes. After every third mini burst, the slot structure of the invention has an additional guard period 124 so that the length of the structure would be the same as the length of the state-of-the-art slot 112 (64 bytes).

In an upstream transmission, the mini slots are synchronized to the SL-ESFs of the control channel controlling the upstream channel in the same way as the larger slots according to the state of the art. In FIG. 5 it is assumed that the bit rate in both the control channel and the upstream channel is 1,544 Mbps. The line 125 illustrates successive SL-ESFs of the downstream control channel. The line 126 illustrates the scheduling of the mini slots of the invention in relation to SL-ESFs, and the line 127 illustrates the corresponding scheduling of the state-of-the art slots, for the sake of comparison. When the bit rate of the upstream channel is said 1,544 Mbps, exactly 27 successive mini slots are scheduled for each downstream SL-ESF. The black diamonds below the line 125 illustrate the slot position references included in the SL-ESF in a known way. As there are three of these in each SL-ESF and as they form an equidistant line, exactly nine mini slots are scheduled between two successive slot position references.

In the specifications of the DAVIC system mentioned earlier, it has been shown how the central configuration determines which slots of the upstream channel are ranging, contention-based, reservation and contentionless-based. The invention does not require any changes to be made in this arrangement, as in accordance with an advantageous embodiment of the invention, the three mini slots which are placed "at the place" of a certain slot according to the state of the art, are all of the same type. The control channel indicates the common type of the said mini slots in a similar way in which it would indicate the type of a state-of-the art slot. In the DAVIC system, the ranging operation aiming at the measuring and compensation of transfer delays is determined so that the mini slots are not applicable to it; thus, the mini slots are either contention-based, reservation, or contentionless. The mini slots of the contentionless type, mainly, are suitable for providing telephone connections and other services requiring a constant data transmission capacity.

The division of an upstream channel into slots or mini slots is called granularity. The central configuration states the granularity of a certain upstream channel, for example, by including the code number related with it to a certain two-bit reservation control field, which is included in the so-called R-bytes of the SL-ESF transmitted in the control channel. According to a proposition, the bit value "10" of the reservation control field (corresponding to the number 2 in the decimal system) indicates that the granularity of the upstream channel is of a size of a slot according to the state of the art, and the bit value "11" (corresponding to the number 3 in the decimal system) indicates that the granularity of the upstream channel is the size of the mini slot. Also in the latter case, the upstream channel may also be used to transmit state-of-the-art bursts, as long as the data terminal equipment transmitting them has three successive mini slots at its disposal. In an upstream channel, the granularity of which is the size of a mini slot, the possible ranging slots are state of the art, and the slots of the contention type are always mini slots, because they are not reserved for any specific data terminal equipment. Slots of the reservation and contentionless types may either be mini slots, or they may be reserved for a specific data terminal equipment three in succession so that the data terminal equipment may transmit state-of-the-art bursts.

The numbering of mini slots of the invention are next described in relation to the numbering of the control channel SL-ESFs. The SL-ESFs contain slot position references in a known way. The number of mini slots in an upstream channel between two successive slot position references and the total number of mini slots in use in one second depend on the bit rate of the upstream channel in accordance with the following table.

TABLE 1

| Bit rate of an upstream channel | Mini slots/slot position reference | Mini slots/second |
|---|---|---|
| 256 kbps | 1.5 | 1500 |
| 1.544 Mbps | 9 | 9000 |
| 3.088 Mbps | 18 | 18000 |

The changes required by the invention to the algorithm, which is shown in the specifications of the DAVIC system and which the data terminal equipment uses for maintaining the slot numbering, are limited to the data terminal equipment giving the value read according to the bit rate from the middle column of the table 1 to the value of the number m. The number m is a parameter present in the said algorithm, which in the state-of-the-art version determines how many slots are accommodated between two successive slot position references. In enclosure 1, the algorithm is shown both in form of the specification and the changed form of the invention.

FIG. 6 illustrates the exchange of MAC (Media Access Control) messages between the central configuration (NRC, Network Related Control) and the data terminal equipment (NIU/STB, Network Interface Unit/Set Top Box) for establishing the connection. Messages 130 and 131 belong to the so-called Initialization and Provisioning phase, messages 132–136 form the so-called Sign-On phase, and messages 137–139 the actual Connection Establishment phase. If data concerning the granularity of the upstream channel is transmitted as previously proposed in the R bytes of the SL-ESFs of the control channel controlling the said channel and it is not referred to in the contents of the message of FIG. 6, the present invention requires changes only in the Connection Establishment phase formed by the messages 137–139, and here, mainly in the message 137 (Connect message). Enclosure 2 illustrates in table form the connect message according to the state of the art and according to an advantageous embodiment of the invention. The first change concerning the Connection_Control_Field of the message, which in the state-of-the-art message is one byte long. According to an advantageous embodiment of the invention, the field is extended to two bytes so that it contains five bits reserved for later use and three new flag bits. The first flag bit indicates whether the connect message includes a so-called second Cyclic_Assignment record, to the contents of which will be reverted later. The second and third flag bits indicate, whether the connect message includes a downstream and upstream connection description of the STM type, which is in the following called DS_STM_CBD and US_STM_CBD, the abbreviation CBD being short for Connection Block Descriptor, in accordance with the established practice in the DAVIC system.

Most advantageously, the second Cyclic_Assignment record is an 8-byte record, which the central configuration may include in the connect message and which is shown in the part of enclosure 2 illustrating the invention. It has four fields of two bytes, of which the start, distance and end fields have the same meaning as in the first Cyclic_Assignment record according to the state of the art. When required, the central configuration uses the second start field (Contentionless_Start Second) for giving the data terminal equipment a second starting slot, from which the data terminal equipment may continue the transmission at intervals indicated by the distance field. The second start field only has to determine one starling slot; an easy way is to determine that if the value of the second start field in the second Cyclic_Assignment record is the same as the value of the end (Contentionless_End) field, the definition of the second starting slot is not valid. The Connect message may include either the first Cyclic_Assignment record, only, the second Cyclic_Assignment record, only, or both the Cyclic_Assignment records so that in the latest alternative each slot group may include three slots determined specifically for the data terminal equipment and their permitted recurrence cycles. Depending on which records are included in the Connect message, the central configuration may give one data terminal equipment the use of the following mini slot multifolds for a slot group when it is required that the position of the slot or slots assigned for the data terminal equipment in relation to the stall and end of the group remains the same from one group to another.

TABLE 2

| Bit rate of an upstream channel | Number of mini slots in slot group | Permitted multifolds, first record | Permitted multifolds, second record | Permitted multifolds, both records |
|---|---|---|---|---|
| 256 kbps | 9 | 1, 3, 9 | 1, 2, 3, 6, 9 | 1, 2, 3, 4, 5, 6, 7, 9 |
| 1,544 Mbps | 27 | 1, 3, 9, 27 | 1, 2, 3, 6, 9, 18, 27 | 1, 2, 3, 4, 5, 6, 7, 9, 10, 11, 12, 15, 18, 19, 21, 27 |
| 3,088 Mbps | 54 | 1, 2, 3, 6, 9, 18, 27, 54 | 1, 2, 3, 4, 6, 9, 12, 18, 27, 36, 54 | 1, 2, 3, 4, 5, 6, 7, 8, 9, 10, 11, 12, 13, 14, 15, 18, 19, 20, 21, 22, 24, 27, 28, 29, 30, 31, 33, 36, 37, 38, 39, 42, 45, 54 |

The basic bit rate of an upstream channel divided into mini slots is 16 kbps in a channel of 256 kbps, and 32 kbps in channels of 1,544 Mbps and 3,088 Mbps. Concerning the permitted multifolds, it especially has to be taken into account that in a channel of 256 kbps, the quadruple bit rate in relation to the basic bit rate, and, in other channels, correspondingly, the double bit rate in relation to the basic bit rate, is 64 kbps, which corresponds to the data transmission need of the afore-mentioned digital telephone system.

Connection descriptors (CBDs) are records which the central configuration uses for transmitting the identifier, frequency and type of a specific connection to the data terminal equipment. The specifications of the DAVIC system determine the connection descriptors for a downstream ATM connection, a downstream MPEG program transmission, and an upstream ATM connection. Because the present invention established a connection of the STM type between the central configuration and the data terminal equipment, which may be bi-directional, it is proposed to determine two new connection descriptors. The new connection descriptors are presented in table form in enclosure 3. According to an advantageous embodiment of the invention, the connection descriptor of a downstream STM connection is a record of seven bytes in length, in which the four first bytes indicate the frequency of the downstream STM type connection in the same way as in known connection descriptors. The next two bytes indicate the unequivocal identifier of the downstream STM connection, which in enclosure 3 has been marked Downstream_STM_ID. The last byte is a code number indicating the modulation method used in the connection in the same way as in state-of-the-art connection descriptors.

According to an advantageous embodiment of the invention, the connection descriptor of an upstream connection of the STM type is also a record of seven bytes in length, in which the four first bytes indicate the frequency of the upstream STM-type connection in the same way as in known connection descriptors. The two next bytes indicate the unequivocal identifier of the upstream STM-type connection, which in the enclosure 3 is denoted with the name Upstream_STM_ID. The last byte is a field containing similar data as the Upstream_Parameters field of the connection descriptor concerning a known upstream ATM connection.

So that the data terminal equipment may be certain that the burst sent by it has reached its destination, the central configuration has to transmit some kind of an acknowledgement for each burst. In a state-of-the-art arrangement, the acknowledgement is included in form of specific indicator bits in the so-called R bytes in the SL-ESFs of the control channel. If in the system of the invention the number relations of the control channels and the upstream channels controlled by them and the bit rates of the channels are determined so that one control channel is able to transmit a sufficient number of R bytes in relation to the upstream channels controlled by it, the same arrangement may also be used for acknowledging bursts transmitted in mini slots. However, in another embodiment of the invention, the indicator bits included in the R bytes are only used for acknowledging the state-of-the-art bursts (ATM cells) transmitted in an area of three successive mini slots. For the acknowledgement of the mini bursts, it is in this case most advantageous to generate a new MAC (Media Access Control) message, which is in the following called a Mini Slot Reception Indicator Message and which is comparable to the MAC messages presented in the DAVIC specification. In FIG. 4, there is presented a proposition for a mini slot reception indicator message in table form. The length of the information parts of the message is 5 bytes, of which the two first bytes contain the number of mini slots in which the first mini burst to be acknowledged has been transmitted. The next byte indicates how many bursts starting from the first one are acknowledged by the same reception indicator message. The two last bytes contain the identification number of the connection to which the bursts to be acknowledged are related.

Mini slots are well suited for the transmission of reservation messages which the data terminal equipment use for informing the central configuration that they wish to reserve (mini) slots. A state-of-the-art reservation message is only 11 bytes long, so it is fitted as part of the 14-byte payload of a mini burst. Three bytes may be reserved for later extensions of the system.

Above, the use of mini slots has been described especially for realizing data transmission in an upstream channel. However, it is also possible to apply the same principle to downstream channels using communication related to separate data terminal connections divided into slots. Although it has been presented above that the basis for a delay-critical service is expressly a digital telephone signal generated with a speed of 64 kbps, the invention does not in any way limit the way how the signal to be transmitted is generated. For one skilled in the art it is obvious that specifications of known cable television systems may be modified further without departing from the inventive idea described in this patent application and defined more closely in the appended claims. It is, for example, possible to increase the numbering space used in MAC messages from the present $2^{13}$ to $2^{16}$; thus, the size of the numbering space would not limit the indication of the mini slots.

Compared with state-of-the-art solutions, the invention does not require any significant changes to be made in the equipment. The known central configurations and data terminal equipment according to the DAVIC system include the necessary signal-processing components for realizing the known synchronization of the SL-ESFs and the upstream slots and the editing of the transmission to frames in the downstream direction and to bursts in the upstream direction. Using the mini slots in the upstream direction requires only that the operation of these pails is resynchronized so that, on the one hand, the data terminal equipment may edit the transmission to short mini bursts and, on the other hand, the central configuration may separate the successive mini bursts from each other and handle them as data units related to different data terminal connections. The resynchronization is most advantageously carried out programmably by making the necessary changes in the program processed by the microprocessor controlling the central configuration, on the one hand, and the data terminal equipment, on the other. Likewise, it is possible to realize the proposed new mini slot reception indicator message and the identification in the data terminal equipment programmatically.

The connection from the cable television further to other data transmission systems, i.e. so-called trunkline networks may be established in may ways. In the DAVIC system it has been proposed that a so-called A4-type interface separates the central configuration from general ATM networks. Because the arrangement of the invention in case of call connections transmits similar delay-critical data of 64 kbps as the known digital telephone systems, it might be advantageous to establish a direct connection from the cable television system to the general SDH network (Synchronous Digital Hierarchy), SONET network (Synchronous Optical NETwork), or PDH network (Plesiochronous Digital Hierarchy) so that the data stream of 64 kbps related to the call connection and transmitted by the mini slots would as such be compatible with the data transmission format used in the trunkline network. If an ATM trunkline network connection in accordance with the DAVIC specifications is used, there are at least two possibilities to make the mini slots and the ATM cells of the trunkline network compatible. According to the first principle, the contents of one mini slot are set to correspond to one ATM cell of the trunkline network so that no extra delay is caused in the data transmission, but a large part of the mainline network capacity is wasted, as the ATM cell could accommodate four times as much data as the mini slot. The other alternative is, in case of an upstream connection, to gather the data of four successive upstream mini slots and use them to fill one ATM cell, which would then be transmitted to the trunkline network. Correspondingly, in downstream direction, the central configuration unpacks the ATM cell arriving from the trunkline network and distributes its contents to four successive downstream mini slots. In this case, the extra data transmission delay is the same as would be caused by the generation of state-of-the-art ATM cells in a data terminal equipment. However, the echo suppressing required by the delay may be carried out in the trunkline network and not in the data terminal equipment of the user as in the state-of-the-art system, which is advantageous, as the data terminal equipment need not contain an echo suppressing operation so that its manufacturing costs can be kept lower.

The control of the use of mini slots is not limited to the reservation arrangement according to the DAVIC system, but also other, more efficient reservation arrangements may be used for assigning the slots for the data terminal equipment. In addition, what is said about cable television systems above and in appended claims, may be generalized to concern data transmission systems, the protocols and operational relations resembling cable television systems, however so that the data transmission is carried out by radio waves instead of a cable. Examples of such systems are known MMDS (Microwave Multipoint Distribution Services) and LMDS (Local Multipoint Distribution Services) systems.

Enclosure 1
Calculation algorithm of M bits according to the state of the art:

```
if(downstream_rate==3.088 Mbit/s) {n = 1;} else {n = 0;}
upstream_slot_position_register==value of M-bits latched at bit_position M11 (M10–M1)

if(upstream_rate==1.544 Mbit/s) {m = 3;}
else if(upstream_rate==3.088 Mbit/s) {m = 6;}
else {m = 0.5)
if(bit_position==M1 and previous M12==1)
{upstream_slot_position_counter = upstream_slot_position_register * 3 * m;} if(bit_position==M5)
if((n==0) or (n==1 and previous M12==0))
{upstream_slot_position_counter = upstream_slot_position_counter + m;} if(bit_position==M9)
if((n = 0) or (n = 1 and previous M12==1))
{upstream_slot_position_counter = upstream_slot_position_counter + m;} if(bit_position==M11)
{temp_upstream_slot_position_register = (M10, M9, M8, ...., M1);}
if((bit_position==M12) and (M12==1))
{upstream_slot_position_register = temp_upstream_slot_position_register;}
```

Calculation algorithm of M bits according to the invention:

```
if(downstream_rate==3.088 Mbit/s) {n = 1;} else {n = 0;} upstream_slot_position_register = value of M-bits latched at bit_position M11 (M10–M1)

if(upstream_rate==1.544 Mbit/s) {m = 9;} else if(upstream_rate==3.088 Mbit/s) {m = 18;} else {m = 1.5} if(bit_position==M1 and previous M12==1)

{upstream_slot_position_counter = upstream_slot_position_register * 3 * m;} if(bit_position==M5)

if((n==0) or (n==1 and previous M12==0))

{upstream_slot_position_counter = upstream_slot_position_counter + m;} if(bit_position==M9)

if((n = 0) or (n = 1 and previous M12==1))

{upstream_slot_position_counter = upstream_slot_position_counter + m;} if (bit_position==M11)

{temp_upstream_slot_position_register = (M10, M9, M8, ...., M1);} if((bit_position==M12) and (M12==1))

{upstream_slot_position_register = temp_upstream_slot_position_register;}
```

Enclosure 2
Connect message according to the state of the art in table form:

| Connect_Message (){ | Bits | Bytes | Bit Number/ Description |
|---|---|---|---|
| Connection_ID | 32 | 4 | |
| Session_Number | 32 | 4 | |
| Resource_Number | 16 | 2 | |
| Connection_Control_Field | 1 | | |
|     DS_ATM_CBD_Included | 1 | | 7: {N/Y} |
|     DS_MPEG_CBD_Included | 1 | | 6: {N/Y} |
|     US_ATM_CBD_Included | 1 | | 5: {N/Y} |
|     Upstream_Channel_Number | 3 | | 4..2 |
|     Slot_List_Included | 1 | | 1: {N/Y} |
|     Cyclic_Assignment | 1 | | 0: {N/Y} |
| Frame_Length | 16 | 2 | |
| Maximum_Contention_Access_ Message_Length | 8 | 1 | |
| Maximum_Reservation_Access_ Message_Length | 8 | 1 | |
| if(Connection_Control_Field== DS_ATM_CBD_Included){ | | | |
|     Downstream_ATM_CBD() | 64 | 8 | |
| } | | | |
| if(Connection_Control_Field== DS_MPEG_CBD_Included){ | | | |
|     Downstream_MPEG_CBD() | 48 | 6 | |
| } | | | |
| if(Connection_Control_Field== US_ATM_CBD_Included){ | | | |
|     Upstream_ATM_CBD() | 64 | 8 | |
| } | | | |
| if(Connection_Control_Field== Slot_List_Included){ | | | |
|     Number_Slots_Defined | 8 | 1 | |
|     for(i=0; i<Number_Slots_Assigned;i++){ | | | |
|         Slot_Number | 13 | 2 | |
|     } | | | |
| } | | | |
| if(Connection_Control_Field== Cyclic_Assignment){ | | | |
|     Contentionless_Start | 16 | 2 | |
|     Contentionless_Dist | 16 | 2 | |
|     Contentionless_End | 16 | 2 | |
| } | | | |
| } | | | |

45 connect message according to the invention in table form:

| Connect_Message (){ | Bits | Bytes | Bit Number/ Description |
|---|---|---|---|
| Connection_ID | 32 | 4 | |
| Session_Number | 32 | 4 | |
| Resource_Number | 16 | 2 | |
| Connection_Control_Field | 2 | | |
|     reserved | 5 | | 11...15 |
|     Second_Cyclic_Assignment_Included | 1 | | 10 |
|     DS_STM_CBD_Included | 1 | | 9 |
|     US_STM_CBD_Included | 1 | | 8 |
|     DS_ATM_CBD_Included | 1 | | 7: {N/Y} |
|     DS_MPEG_CBD_Included | 1 | | 6: {N/Y} |
|     US_ATM_CBD_Included | 1 | | 5: {N/Y} |
|     Upstream_Channel_Number | 3 | | 4..2 |
|     Slot_List_Included | 1 | | 1: {N/Y} |
|     Cyclic_Assignment | 1 | | 0: {N/Y} |
| Frame_Length | 16 | 2 | |

-continued

| Connect_Message (){ | Bits | Bytes | Bit Number/ Description |
|---|---|---|---|
| Maximum_Contention_Access_ Message_Length | 8 | 1 | |
| Maximum_Reservation_Access_ Message_Length | 8 | 1 | |
| if(Connection_Control_Field== DS_STM_CBD_Included){ | | | |
| Upstream_STM_CBD() | 64 | 8 | |
| } | | | |
| if(Connection_Control_Field== US_STM_CBD_Included){ | | | |
| Downstream_STM_CBD() | 64 | 8 | |
| } | | | |
| if(Connection_Control_Field== DS_ATM_CBD_Included){ | | | |
| Downstream_ATM_CBD() | 64 | 8 | |
| } | | | |
| if(Connection_Control_Field== DS_MPEG_CBD_Included){ | | | |
| Downstream_MPEG_CBD() | 48 | 6 | |
| } | | | |
| if(Connection_Control_Field== US_ATM_CBD_Included){ | | | |
| Upstream_ATM_CBD() | 64 | 8 | |
| } | | | |
| if(Connection_Control_Field== Slot_List_Included){ | | | |
| Number_Slots_Defined | 8 | 1 | |
| for(i=0; i<Number_Slots_Assigned;i++){ | | | |
| Slot_Number | 13 | 2 | |
| } | | | |
| } | | | |
| if(Connection_Control_Field== Cyclic_Assignment){ | | | |
| Contentionless_Start | 16 | 2 | |
| Contentionless_Dist | 16 | 2 | |
| Contentionless_End | 16 | 2 | |
| } | | | |
| if(Connection_Control_Field== Second_Cyclic_Assignment){ | | | |
| Contentionless_Start | 16 | 2 | |
| Contentionless_Start_Second | 16 | 2 | |
| Contentionless_Dist | 16 | 2 | |
| Contentionless_End | 16 | 2 | |
| } | | | |
| } | | | |

Enclosure 3

Connection descriptor of a downstream STM connection in table form:

| Downstream_STM_CBD(){ | Bits | Bytes | Bit Number/ Description |
|---|---|---|---|
| Downstream_Frequency | 32 | 4 | |
| Downstream_STM_ID | 16 | 2 | |
| Downstream_Type | 8 | 1 | {enum} |
| } | | | |

Connection descriptor of an upstream STM connection in table form:

| Upstream_STM_CBD () { | Bits | Bytes | Bit Number/ Description |
|---|---|---|---|
| Upstream_Frequency | 32 | 4 | |
| Upstream_STM_ID | 16 | 2 | |
| Upstream_Parameters | | 1 | |
| MAC_Flag_Set | 5 | | 7..3 |
| Upstream_Rate | 3 | | 2..0: {enum} |
| } | | | |

Enclosure 4
Mini slot reception indicator message in table form:

| Mini_Slot_Reception_Indicator_Message() {Bits | Bytes | Bit Number/ Description |
|---|---|---|
| First_Mini_Slot | 16 | 2 |
| Number_of_Mini_Slots | 8 | 1 |
| for(i=0; i<Number_Mini_Slots;i++){ | | |
| Reservation ID or STM_ID | 16 | 2 |
| } | | |
| } | | |

What is claimed is:

1. A method for transmitting digital data in a channel of a cable television system applying time division multiple access in which slots of a defined slot length are assigned for terminal equipment in order to distribute the use of data transmission capacity to the equipment, and the use of slots in the cable TV system are controlled by use indications transmitted downstream, characterized in that the slots are further divided into mini slots, the use of which is controlled by the indications transmitted downstream wherein the mini slots are divided into successive mini slot groups of regular and equal temporal duration, and for ensuring that a specific equipment has a specific regular data transmission capacity, it is assigned at least one mini slot of a specific mini slot group so that the assigned mini slot is repeated cyclically at intervals of a certain number of mini slot groups.

2. The method of claim 1, characterized in that the length of three mini slots plus a guard byte is the same as the defined slot length.

3. The method of claim 1, characterized in that the cyclically repeated mini slot assigned for a specific equipment is repeated in every mini slot group and that it is always situated at the same place in relation to the start and end of the mini slot group.

4. The method of claim 1, characterized in that the cyclically repeated mini slot assigned for a specific equipment is repeated in mini slot groups between which there is a certain number of mini slot groups, in which the corresponding mini slot has not been assigned for the use of the equipment in question.

5. The method of claim 1, characterized in that, as a method, it is compatible with DAVIC 1.0 and 1.1 specifications.

6. The method of claim 1, characterized in that the digital data contains delay-critical data.

7. the method of claim 1, characterized in that, for ensuring that a specific equipment has a certain regular data transmission capacity, it is assigned plural mini slots from a mini slot group so that when the assigned mini slots are repeated cyclically at intervals of a specific number of mini slot groups, they are always situated at the same place in relation to the start and end of the mini slot group.

8. A cable television system comprising a central configuration and several data terminal equipment in a data transmission connection where data is transmitted by cables, the central configuration comprising means for receiving data from data terminal equipment in accordance with a time division principle in slots, and means for establishing control commands to assign said slots for the use of separate data terminal equipment; in which cable television system, at least one data terminal equipment includes means for receiving control commands from the central configuration, and means for transmitting digital data to the central configuration in burst form in a slot defined by the control commands; characterized in that the central configuration comprises means for resynchronizing the control commands so that they assign mini slots for the use of separate data terminal equipment, which are temporally shorter than the slots, and that the data terminal equipment comprises means for transmitting data as mini bursts the size of a mini slot so that the data terminal equipment is provided to transmit data as bursts or mini bursts according to what kind of control commands it receives from the central configuration, and that the mini slots are divided into successive mini slot groups of regular and equal temporal duration, and for ensuring that a specific equipment has a specific regular data transmission capacity, it is assigned at least one mini slot of a specific mini slot group so that the assigned mini slot is repeated cyclically at intervals of a certain number of mini slot groups.

9. The method of claim 8, characterized in that the cyclically repeated mini slot assigned for a specific equipment is repeated in every mini slot group and that it is always situated at the same place in relation to the start and end of the mini slot group.

10. The method of claim 9, characterized in that the cyclically repeated mini slot assigned for a specific equipment is repeated in mini slot groups between which there is a certain number of mini slot groups, in which the corresponding mini slot has not been assigned for the use of the equipment in question.

11. The method of claim 9, characterized in that, for ensuring that a specific equipment has a certain regular data transmission capacity, it is assigned plural mini slots from a mini slot group so that when the assigned mini slots are repeated cyclically at intervals of a specific number of mini slot groups, they are always situated at the same place in relation to the start and end of the mini slot group.

12. The method of claim 9, characterized in that the digital data contains delay-critical data.

13. The method of claim 9, characterized in that, as a method, it is compatible with DAVIC 1.0 and 1.1 specifications.

* * * * *

UNITED STATES PATENT AND TRADEMARK OFFICE
CERTIFICATE OF CORRECTION

PATENT NO.  : 6,091,440
DATED       : July 18, 2000
INVENTOR(S) : H. Kokkinen

It is certified that error appears in the above-identified patent and that said Letters Patent is hereby corrected as shown below:

Column 19,
Line 53, please change "the" to -- The --.

Column 20,
Line 33, please change "method" to -- system --;
Line 38, please change "method" to -- system --, and please change "9" to -- 8 --;
Line 45, please change "method" to -- system --, and please change "9" to -- 8 --;
Line 52, please change "method" to -- system --, and please change "9" to -- 8 --; and
Line 54, please change "method" to -- system --, and please change "9" to -- 8 --.

Signed and Sealed this

Twenty-ninth Day of April, 2003

JAMES E. ROGAN
*Director of the United States Patent and Trademark Office*